(No Model.)

L. ATWOOD.
COG WHEEL.

No. 447,552. Patented Mar. 3, 1891.

Witnesses:
Hamilton D. Turner.
R. Schleicher.

Inventor:
Leonard Atwood
by his Attorneys
Howson & Howson

UNITED STATES PATENT OFFICE.

LEONARD ATWOOD, OF PHILADELPHIA, PENNSYLVANIA.

COG-WHEEL.

SPECIFICATION forming part of Letters Patent No. 447,552, dated March 3, 1891.

Application filed August 28, 1890. Serial No. 363,274. (No model.)

*To all whom it may concern:*

Be it known that I, LEONARD ATWOOD, a citizen of the United States, and a resident of Philadelphia, Pennsylvania, have invented certain Improvements in Cog-Wheels, of which the following is a specification.

The object of my invention is to construct a cog-wheel in which the shanks of the teeth are embedded in the rim and fastened therein, and also provide means by which the wheel, although keyed to the shaft, may be readily removed therefrom in the manner described hereinafter, reference being had to the accompanying drawings, in which—

Figure 1:
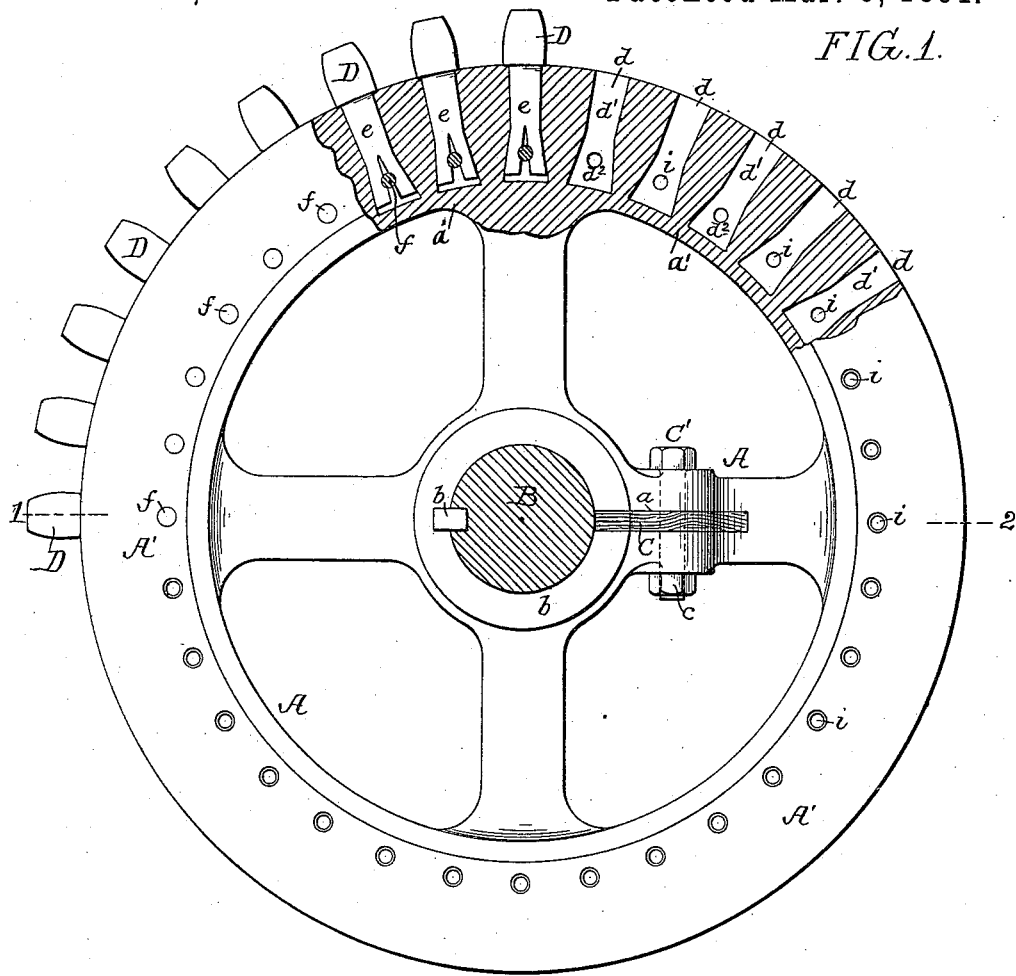
Figure 2:
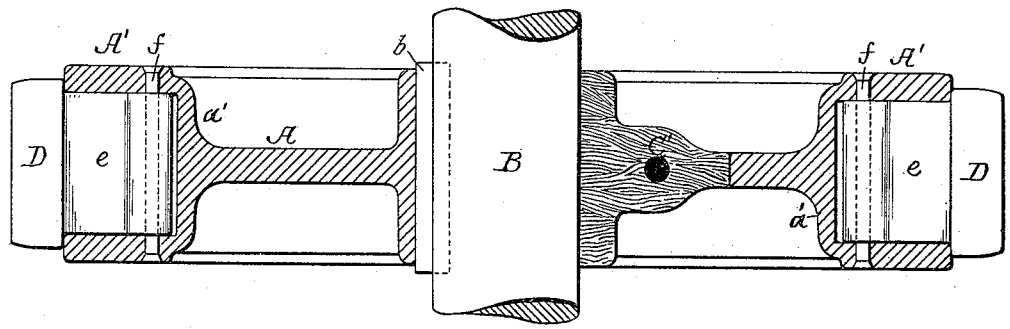

Figure 1 is a side view, partly in section, of my improved cog-wheel with a number of the teeth inserted therein. Fig. 2 is a sectional plan view on the line 1 2, Fig. 1.

Heretofore cog-wheels with insertible teeth have been provided with a comparatively thin rim, and the shanks of the teeth are passed entirely through this rim and are keyed at the back of the rim, the keys being generally exposed, and when a wheel has been fixed to a shaft it is generally a difficult task to remove the wheel without injuring one of the several parts. I overcome the above difficulties in the following manner, reference being had to the accompanying drawings, in which—

A is the body of the wheel, keyed to the shaft B by an ordinary key $b$, fitting into keyways both in the wheel and in the shaft. Preferably cut in the wheel opposite to the keyway is a slot $a$, in which is inserted a block C, of wood or other material that will take up the ringing sound of the wheel and deaden the noise. This block C is held in the slot by a bolt C', having a nut $c$. After the wheel has been set upon the shaft and keyed thereto the nut is turned on the bolt, so as to draw the wheel tightly upon the shaft. Thus the wheel is not only held by the key, but also by friction. The rim A' of the wheel in the present instance has a series of pockets $d$, each pocket having a double taper, one portion $d'$ of the pocket tapering inward and the other portion $d^2$ at the base of the pocket tapering in the opposite direction, forming an undercut section, in which the tooth is expanded. The partitions forming the pockets are tied together at their bases by the band $a'$, so as to prevent the partitions springing when the teeth are driven in and expanded.

D is the tooth. The shank $e$ of said tooth is tapered to fit the tapered pockets $d$.

In each of the side plates of the flange of the wheel are orifices $i$, and the shank of each tooth is slotted at the base, as shown in Fig. 1, the slot coming in line with the orifices in the side walls of the flange. Through these orifices and into the slotted portion of the tooth is driven a pin $f$, which expands the base portion of the shank of the tooth into the undercut portion of the pocket, thus firmly locking the tooth to the flange of the wheel, the shank and its fastening being incased by the flange. In the side walls of the slot in the tooth are transverse grooves, and when the tooth is driven into its slot the grooves are in line with the orifices in the walls of the pockets, so that the pins are guided accurately as they are driven through the tooth. In some instances a small guiding-orifice may be made in the shank of the tooth, which will split when the pins are driven. By tying the partitions together and to the side walls by the band $a'$ I am enabled to connect the spokes or web of the wheel at the center, as shown, making a symmetrical wheel. By simply driving out one of the pins the tooth held thereby can be readily removed and replaced if necessary.

I claim as my invention—

1. The combination of the flange having undercut pockets therein and teeth in said pockets with transverse pins passing through the side walls of the pockets and through the shanks of the teeth and expanding the teeth into the undercut portions of the same, substantially as specified.

2. The combination of the flange, tapered and undercut pockets therein, and teeth having tapered and slotted shanks with transverse pins passing through the side walls of the pockets and through the slotted portions of the teeth, whereby the teeth are expanded, substantially as and for the purpose specified.

3. The combination of the wheel having a radial slot, an independent key-seat therein, a shaft, and a key adapted to said shaft and to the key-seat in the wheel with a bolt for drawing the wheel tightly to the shaft after it has been keyed thereto, substantially as specified.

4. The combination of the shaft, a wheel having a key-seat therein, a key adapted to the shaft and wheel, a radial slot in said wheel, and a deadening-block in said slot with a device for drawing the wheel tightly to the shaft, substantially as described.

5. The combination of the flange having undercut pockets, cog-teeth therein, the shank of each cog-tooth slotted and having a guiding-groove, and pins passing through the side walls of the pockets and through the guiding-grooves of the teeth, substantially as and for the purpose specified.

6. A gear-tooth having a head forming the tooth proper and a shank tapered from the shoulder to the end of the shank, said shank being split part way for the insertion of an expanding pin, so as to give a reverse taper to the end of the shank, substantially as set forth.

In testimony whereof I have signed my name to this specification in the presence of two subscribing witnesses.

LEONARD ATWOOD.

Witnesses:
H. F. REARDON,
HENRY HOWSON.